Patented Oct. 19, 1943

2,332,121

UNITED STATES PATENT OFFICE 2,332,121

PRINTING COMPOSITION

William W. Trowell, Greenville, S. C., assignor to Hercules Powder Company, Wilmington, Del., a corporation of Delaware No Drawing. Application September 9, 1939, Serial No. 294,203

2 Claims. (Cl. 8—62)

This invention relates to an improved textile printing paste and to a printed textile fabric printed with the improved printing paste. More particularly, the invention relates to a textile printing paste containing a water-soluble dyestuff and to a fabric printed with such a printing paste.

Water-soluble dyestuffs of several types are used in printing textile fabrics of a cellulosic base. It has been customary to apply water-soluble dyestuffs to textile fabrics from pastes containing starch or a water-soluble gum as a carrier for the color.

It is an object of this invention to provide a textile printing paste containing a water-soluble dyestuff and an improved carrier for the dyestuff.

It is a further object of this invention to provide an improved printed textile fabric.

The above objects may be accomplished in accordance with this invention by the preparation of printing pastes suitable for textile printing containing a water-soluble dyestuff and as a thickener and carrier an aqueous emulsion of a water-insoluble cellulose ether. Application of the printing paste to a textile fabric in any suitable manner, such as by printing the fabric with the paste and then drying and steaming the fabric, provides the improved printed textile fabric.

The aqueous emulsion of a water-insoluble cellulose ether useful in this invention may be either of the oil-in-water type or of the water-in-oil type. Water-insoluble cellulose ethers, as, for example, ethyl cellulose, propyl cellulose, butyl cellulose, benzyl cellulose, mixed ethyl benzyl cellulose, mixed ethyl butyl cellulose, etc., may be used.

The aqueous emulsion of a cellulose ether may include, if desirable, a plasticizer for the cellulose ether or a suitable synthetic resin, or both. As plasticizers for the cellulose ether, a solid or a liquid plasticizer may be used. Suitable plasticizers are hydrogenated methyl abietate, hydrogenated ethyl abietate, triphenyl phosphate, tributyl phosphate, methylphthalylmethyl glycollate, ethylphthalylethyl glycollate, etc. As suitable resins a resin which is compatible with the cellulose ether, is resistant to alkalies and exerts a softening action on the cellulose ether may be used. By softening action I mean a lowering of the melting point of the cellulose ether and not necessarily a plasticizing of the cellulose ether in the strict sense of the term. Thus, I have found that rosin modified alkyd resins, such as rosin modified or hydrogenated rosin modified terpene-maleic anhydride resins, rosin modified maleate resins, drying oil modified terpene-maleic anhydride resins, polymerized hydrocarbon resins, such as polymerized naphthalene, polymerized coumarone-indene, or hydrogenated forms thereof, 100% phenolic resins, polyhydric alcohol esters of hydrogenated rosin, as well as other types having the above defined properties, may be used with the cellulose ether.

As emulsifying agents for preparing the aqueous emulsion of the cellulose ether with or without a plasticizer and with or without a suitable resin, I may employ, for example, the alkali metal salts of the higher aliphatic half ester sulfates, as sodium lauryl sulfate, sodium stearyl sulfate, etc.; sulfonated oils, as sulfonated castor oil, sulfonated olive oil, etc.; soaps, as sodium stearate, potassium oleate, sodium oleate, etc.; alkali metal salts of alkyl naphthalene sulfonic acids, as sodium butyl naphthalene sulfonate, sodium isopropyl naphthalene sulfonate, etc.

The cellulose ether, together with the plasticizer and resin, if either or both are employed, will preferably be dissolved in a suitable water-immiscible solvent mixture before emulsification and the solvent solution emulsified in water by means of the emulsifying agent. Suitable solvent mixtures may include solvents, swelling agents or diluents such as, for example, light aromatic hydrocarbons; petroleum hydrocarbons, as, for example, Stoddard solvent; butanol; pine oil, etc. By Stoddard solvent is meant the petroleum hydrocarbon solvent known in the industry by that name and generally having a distillation range of approximately 152° C. to 195° C.

The oil-in-water type of cellulose ether emulsion utilized in this invention may be prepared by emulsifying a water-immiscible solvent solution of the cellulose ether in water by means of a suitable emulsifying agent, such as described above. The water-in-oil type of cellulose ether emulsion useful in the invention may be prepared conveniently by reversing the oil-in-water type of emulsion prepared as described above with a suitable reversing agent. Alternatively, the water-in-oil emulsion of the cellulose ether may be prepared directly without the intermediate preparation of the oil-in-water type of emulsion. Reversing agents suitable for converting the oil-in-water cellulose ether emulsion to an emulsion of the water-in-oil type are for example, aluminum stearate, acetic acid, a mixture of pine oil and acetic acid, an alkali as potassium or sodium hydroxide, etc. If it is desirable to prepare the water-in-oil type of emulsion directly, this may be done, for example, by adding one of the above reversing agents to the solvent solution of the cellulose ether and emulsifying in water with an emulsifying agent.

The dyestuffs which I contemplate using in this invention are those dyestuffs which belong to the general class of water-soluble dyestuffs. These may include direct or substantive dyes capable of dyeing cotton fabrics. Some of the common dyestuffs belonging to this general class and which provide the desirable features of my invention are known to the trade under the following names:

|  | Color Index No. |
|---|---|
| Pontamine Yellow CH | 365 |
| Pontamine Fast Red 8BL | 278 |
| Pontamine Fast Blue 4GL | 533 |
| Pontamine Fast Orange | Pr 55 |
| Pontamine Fast Green GL | None |
| Pontamine Fast Pink G | Pr 27 |
| Pontamine Fast Violet 4BL | None |
| Pontamine Fast Brown RKL | None |
| Pontamine Fast Orange WS | 326 |

The printing pastes prepared and utilized in accordance with this invention may be prepared by dissolving the water-soluble dyestuff in water and mixing the dye solution with the aqueous cellulose ether emulsion in any suitable manner. The body and thickness of the printing paste may be varied as desired by variation of the ingredients of the emulsion, by variation of the amount of dissolved solids in the emulsion or by the nature and amount of the solvent used. If desired, the printing paste may be further thickened by use of starch or a soluble gum, such as gum tragacanth as an additional thickener.

The solids content of the aqueous cellulose ether emulsion utilized in the printing paste will usually not be in excess of about 50% by weight and preferably will be within the range of about 2% to about 30%. The dyestuff content of the printing paste may be adjusted to provide the shade desired and will depend to a large extent on the coloring value of the particular dyestuff employed. The total solids content of the printing paste may also be varied over wide limits and will be allied to a certain extent with the solids content of the aqueous cellulose ether emulsion used. It will also vary with the amount of dyestuff used. Generally speaking, the total solids content of the printing paste will not exceed about 45% by weight and preferably will not exceed about 25% by weight.

The textile printing pastes produced in accordance with this invention may be applied to fabrics in the usual manner by means of printing rollers or screens, such as screen printing, followed by drying the printed fabric and subjecting it to a steam treatment.

The printed fabric produced by printing a textile fabric with a printing paste as described above will be characterized as carrying a print of a water-soluble dyestuff containing a water-insoluble cellulose ether alone or mixed with either a plasticizer or a suitable resin, or both.

The following examples illustrate the invention.

EXAMPLE I

A solution was prepared containing the following ingredients:

|  | Parts by weight |
|---|---|
| Ethyl cellulose (high viscosity) | 12 |
| Xylol | 59 |
| Hi-Flash naphtha | 14 |
| Butanol | 15 |

Two hundred parts by weight of the above solution were emulsified with 100 parts by weight of water containing 1.5 parts by weight of potassium oleate. To 200 parts by weight of the oil-in-water emulsion produced, 100 parts by weight of pine oil and 0.5 part by weight of glacial acetic acid were added with stirring, a smooth water-in-oil emulsion resulting.

Printing pastes were then prepared from the water-in-oil ethyl cellulose emulsion by dissolving a water-soluble direct dyestuff in hot water, adding Stoddard solvent to the dye solution and then adding the water-in-oil ethyl cellulose emulsion with stirring, the proportions of ingredients of three separate printing paste preparations being those shown in Table 1 below.

Table 1

|  | 1 | 2 | 3 |
|---|---|---|---|
|  | Parts by weight | Parts by weight | Parts by weight |
| Water-in-oil ethyl cellulose emulsion of Example I | 30 | 30 | 30 |
| Pontamine Yellow CH | 4 |  |  |
| Pontamine Fast Pink G |  | 4 |  |
| Pontamine Fast Blue 4GL |  |  | 4 |
| Stoddard solvent | 22 | 22 | 22 |
| Water | 44 | 44 | 44 |

In each of the three cases a smooth thick paste was formed. The solids content of each paste was approximately 5.70%. Each paste was used to print 80 x 80 print cloth, and the printed cloth dried and steamed for one hour in neutral steam vapors.

EXAMPLE II

A solution was prepared containing the following ingredients:

|  | Parts by weight |
|---|---|
| Ethyl cellulose (high viscosity) | 16 |
| Triphenyl phosphate | 8 |
| Glycerol ester of hydrogenated wood rosin | 5 |
| Xylol | 53 |
| Hi-Flash naphtha | 10 |
| Butanol | 8 |

Two hundred parts by weight of the above solution were emulsified with 100 parts by weight of water containing 1.5 parts by weight of potassium oleate. The emulsion was passed through an homogenizer. The oil-in-water emulsion obtained was used in formulating printing pastes by dissolving a water-soluble direct dyestuff in hot water, adding a starch-gum tragacanth solution to the dye solution and adding this solution to the oil-in-water ethyl cellulose emulsion containing added potassium oleate very slowly with stirring, the proportions of ingredients of five separate printing paste preparations being those shown in Table II below.

Table 2

|  | 1 | 2 | 3 | 4 | 5 |
|---|---|---|---|---|---|
|  | Parts by weight | Parts by weight | Parts by weight | Parts by weight | Parts by weight |
| Oil-in-water ethyl cellulose emulsion of Example II | 15 | 20 | 10 | 30 | 20 |
| Starch-tragacanth solution [1] | 40 | 35 | 45 | 25 | 35 |
| Pontamine Yellow CH | 2 |  |  |  |  |
| Pontamine Fast Red 8BL |  | 2 |  |  |  |
| Pontamine Fast Blue 4GL |  |  | 2 |  |  |
| Pontamine Fast Orange |  |  |  | 2 |  |
| Pontamine Fast Green GL |  |  |  |  | 2 |
| Water | 38 | 38 | 38 | 38 | 38 |
| Potassium oleate (15% solution) | 5 | 5 | 5 | 5 | 5 |

[1] One part by weight gum tragacanth (6 oz. per gal.). Three parts by weight cornstarch (10% solution).

Each printing paste was smooth and thick. Each paste was printed on 80 x 80 print cloth as in Example I.

The improved printing pastes described in accordance with this invention present several distinct advantages over printing pastes containing water-soluble dyestuffs and starch or soluble gums as carriers. Use of the cellulose ether emulsion in the printing paste of the type described reduces the tendency of the dyestuff to bleed from the printed areas when the fabric is submitted to a wet treatment. The printed fabric exhibits improved crock resistance due to the effect of the cellulose ether on the dyestuff. Considerably less stiffness is imparted to the printed areas of the fabric over starch or gum pastes particularly when water-in-oil cellulose ether emulsions are used.

It will be understood that the details and examples hereinbefore set forth are illustrative only, and that the invention as broadly described and claimed is in no way limited thereby.

What I claim and desire to protect by Letters Patent is:

1. A textile printing paste comprising an emulsion having a discontinuous phase comprising a solution of a water-insoluble cellulose ether in a volatile water-immiscible organic solvent, and a continuous phase comprising an aqueous solution of a water-soluble dyestuff.

2. A textile printing paste comprising an emulsion having a discontinuous phase comprising a solution of a water-insoluble ethyl cellulose in a volatile water-immiscible organic solvent, and a continuous phase comprising an aqueous solution of a water-soluble dyestuff.

WILLIAM W. TROWELL.